Feb. 2, 1965  N. F. STEINEMAN  3,167,866
BORE AXIS LOCATING TOOL
Filed Aug. 7, 1961  2 Sheets-Sheet 1

Norbert F. Steineman INVENTOR.

BY Allen A. Hicks

Attorney

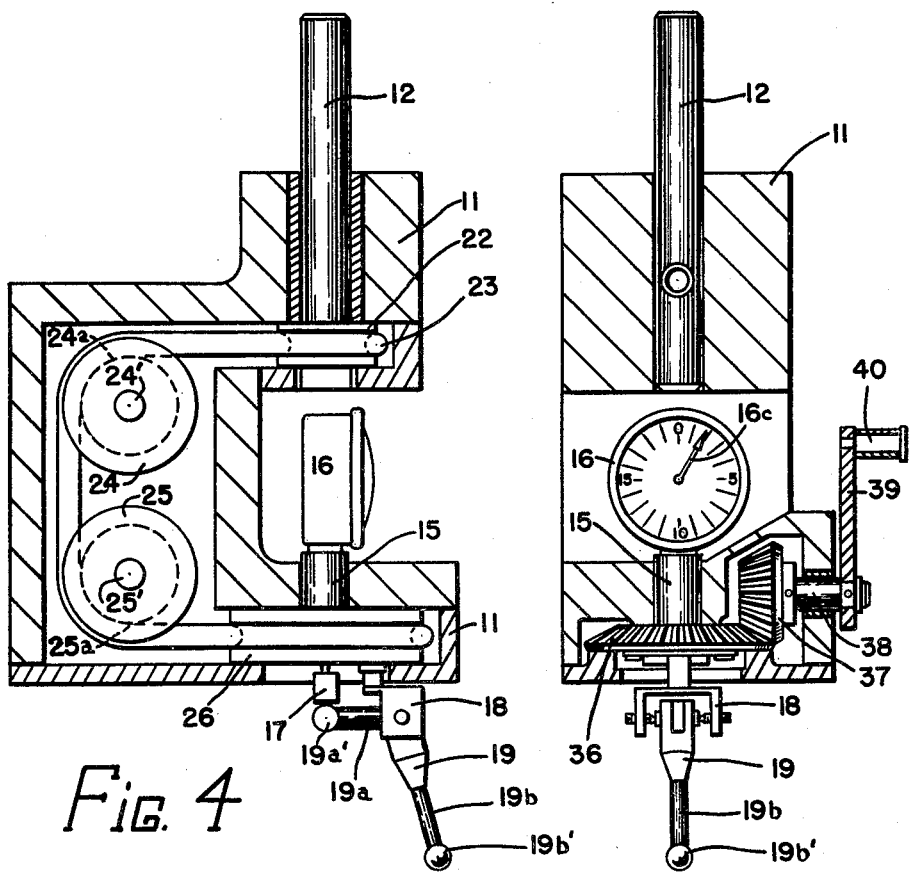

United States Patent Office 3,167,866
Patented Feb. 2, 1965

3,167,866
BORE AXIS LOCATING TOOL
Norbert F. Steineman, 122 N. Water St.,
New Bremen, Ohio
Filed Aug. 7, 1961, Ser. No. 129,887
4 Claims. (Cl. 33—172)

This invention relates to an improved bore axis locating tool and has for an object to provide a tool of this type which is simpler in construction and more convenient in use.

An object of this invention is to provide such a tool adapted for locating a hole or a boss on a workpiece relative to the axis of a rotating tool carrier.

Another object is to provide such a tool or instrument having an indicator, preferably of standard construction, which is held stationary while a feeling finger associated therewith is revolved about the axis of the tool holder.

A more specific object is to provide such a tool or instrument in which an arm associated with the feeler finger bears on an indicator operating member, the bearing point being substantially in line with the axis of the tool holder.

With these and incidental objects in view, the invention includes certain novel features of construction and combinations of parts, the essential elements of which are set forth in the appended claims, and several forms or embodiments of which are hereinafter described with reference to the drawings which accompany and form part of this specification.

In said drawings.

Figure 2:
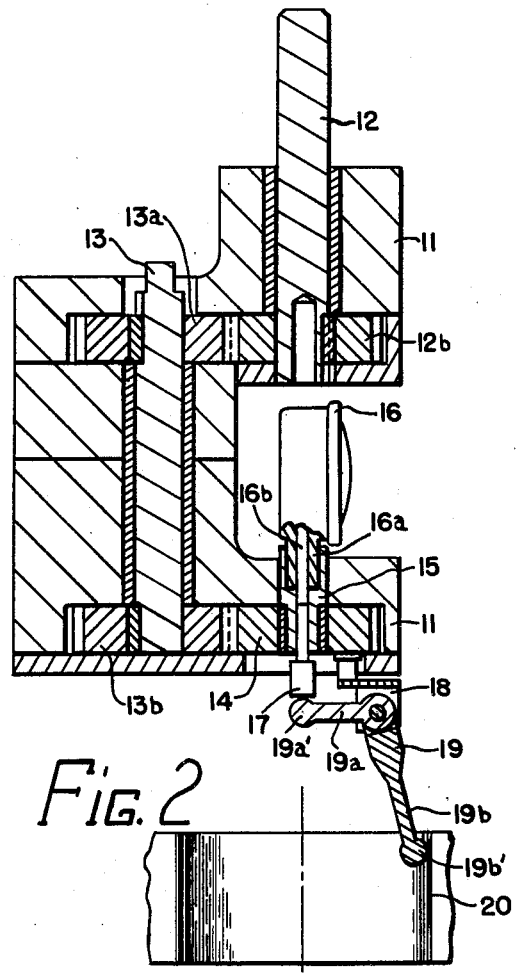
FIG. 2 is a cross-sectional view taken on the line 2—2 of FIG. 1, most of the indicator being shown in full lines.
Figure 1:
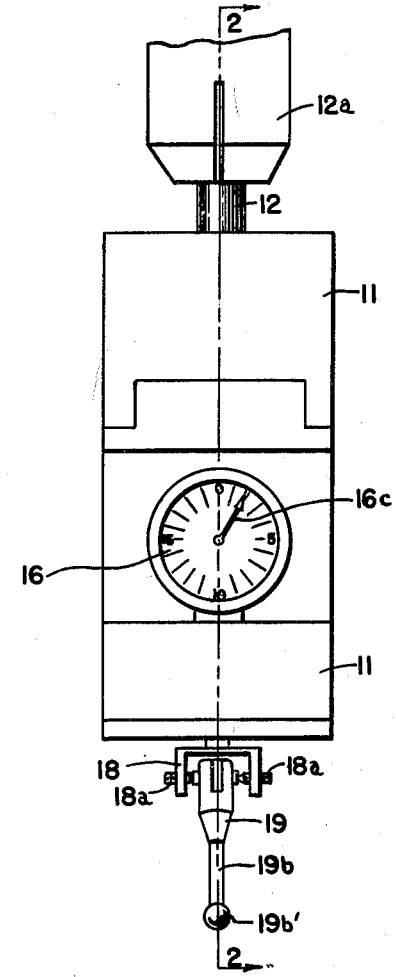
FIG. 1 is a front elevation of an illustrative form of such bore axis locating tool shown carried by the spindle of a machine such as a jig borer.

FIG. 4 is a view similar to FIG. 2 illustrating a form of construction in which a belt drive is utilized; and FIG. 5 is a view similar to FIG. 1 illustrating a form of construction in which the feeler member is revolved by a a hand crank operating through gears. The tool comprising the present invention, as illustrated by the several forms of embodiment shown in the drawings, is provided for accurately aligning the tool axis of a boring machine, such as a jig borer, with the axis of a previously drilled or bored hole, or a boss on a workpiece, for reboring the hole, turning the boss or for locating new holes.

In some known tools for this purpose the indicator rotates with the chuck of the boring machine which makes it difficult to read the indicator. According to the present invention the parts are so constructed that the indicator may be held stationary by the hand of the operator while the chuck of the boring machine rotates the feeler finger or while the feeler finger is revolved by means of a hand crank or other auxiliary driving device.

Referring to the drawings, 11 indicates the body of the tool which is held stationary by the user. Supported therein is the shaft 12 which is carried by the collet or chuck 12a of the boring machine. In the form shown in FIGS. 1, 2 and 3, shaft 12 carries a gear 12b which meshes with a gear 13a attached to counter shaft 13 which carries on its other end a gear 13b. The gear 13b meshes with a gear 14 which is journalled on a hollow bushing 15 carried by the frame 11. The indicator 16 has a shank 16a fixed in the bushing 15 fixed to the frame 11. Slidably mounted in the bushing 15 is a plunger 17 the upper end of which engages with or is attached to the actuating plunger 16b of the indicator in such a way that movement of the plunger 17 causes movement of the indicator hand 16c.

Carried on the gear 14 is a U-shaped bracket 18 having a more-or-less horizontal arm and downwardly extending arms which are provided with pivot bearings 18a within which is supported the adjustable bell crank 19 comprising a more-or-less horizontal arm 19a having a spherical end 19a′ and a more-or-less vertical arm 19b, frictionally adjustable with respect to each other to adjust for holes of different diameters. The arm 19b terminates in a spherical end 19b′ adapted to bear against the wall of a hole in the workpiece 20 or on the exterior of a boss (not shown). For use on the exterior of a boss a suitable light spring may be provided to bias the bellcrank lever 19 in a clockwise direction.

In use the operator holds the tool body 11 against rotation in a position where he can conveniently see the indicator face. He then causes the tool spindle to rotate at a slow speed. Through shaft 12, gear 12b, gear 13a, shaft 13 and gear 13b, the gear 14 is rotated. This causes the bracket 18 to be revolved around the axis of the gear 14 which must be very accurately aligned with the axis of the shaft 12 and of the spindle of the boring machine. If the arm 19b is so adjusted that its ball end 19b′ strikes the surface of the hole, the indicator hand 16c will be deflected accordingly. As the feeler continues to revolve the indicator hand 16c will oscillate and inform the user as to the direction and extent of inaccuracy of alignment. This enables the user to adjust the work table longitudinally and/or transversely in the proper direction until the indicator hand 16c remains stationary, at a point other than zero, indicating that alignment of the hole axis with the machine axis has been achieved. If the misalignment is originally so great that the indicator hand 16c returns to zero during part of the revolution, indicating that ball end 19b′ has lost contact with the hole surface during that part of the revolution, it is necessary to stop the machine and to adjust the arm 19b relative to the arm 19a to swing the ball end 19b′ to a greater radius.

After the work table has been so adjusted that the indicator hand 16c shows a constant deflection during a full revolution of the finger 19, exact alignment has been achieved. The machine is then stopped, the tool removed from the collet or chuck 12a and a suitable boring tool substituted.

It will be noted that the ball end 19a′ of the arm 19a bears upon the plunger 17 at the axis of the plunger. This is very important in that much greater accuracy can be achieved than would be possible if this bearing point were located away from the axis.

Figure 3:
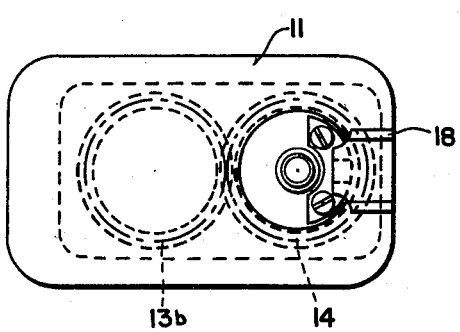
FIG. 3 is a bottom view of the tool shown in FIG. 1 and 2, the feeler elbow lever being omitted.

In the form of construction shown in FIG. 4, the gear drive is replaced by a belt drive which may consist of a belt pulley 22, belt 23, coaxial idler pulleys 24 and 24a mounted on shaft 24′, coaxial idler pulleys 25 and 25a mounted on shaft 25′, and driven belt pulley 26 mounted in the same manner as gear 14 of FIGS. 2 and 3. It will be noted that when shaft 12 is rotated, belt pulley 26 will be turned at a lower speed and in the opposite direction. The operation is generally the same as that of the form of FIGS. 1, 2 and 3.

It is not always essential that the revolution of the feeler 19 be effected by the boring machine itself. In the form of FIG. 5, the shaft 12 is fixed in the body 11 of the tool. It is clamped into the collet or chuck 12a, which is not rotated while the tool is used to align the work. In this form of construction, the feeler supporting bracket 18 is mounted on a rotary member 36 which is mounted on a bushing 15 in the same manner as the gear 14 in FIGS. 2 and 3. Suitable means are provided to rotate the member 36 as by hand or auxiliary power. In the form shown in FIG. 5, the member 36 constitutes a bevel gear with which meshes the bevel gear 37 carried on a shaft 38 journalled in the housing and carrying a crank arm 39 having a crank handle 40. In use, the operator turns crank 40 (or the member 36 directly) with one hand and since it is not necessary to hold the tool against rotation, he has the other hand free to adjust the work table until correct alignment is achieved in the described manner. In FIG. 5, the gears are shown of such size as to provide for a gear reduction. A 1-to-1 gearing or a speed-up gearing might also be utilized.

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In an axis locating tool, the combination of a supporting shaft adapted to be clamped into the rotatable tool holder of a machine tool in alignment with the axis of rotation of said tool holder, a tool body supported by said shaft, a rotatable support member so carried by said tool body that its axis of rotation is fixed in alignment with the axis of rotation of said shaft and said tool holder, an elbow feeler lever pivoted to a support bracket mounted on said rotatable support member, an indicator attached to said tool body and having an operating plunger aligned with the axis of said supporting shaft, said elbow feeler lever comprising a contact arm adapted to contact a workpiece and an arm transverse to said contact arm and frictionally pivoted to said contact arm, the end of siad transverse arm being engageable with the plunger of said indicator near the axis of said plunger.

2. The combination according to claim 1 in which the supporting shaft is fixed to the tool body, together with manual operating means for rotating the rotatable elbow feeler lever support member.

3. The combination according to claim 1 in which the supporting shaft is fixed to the tool body, together with manual operating means for rotating the rotatable elbow feeler lever support member, said manual operating means comprising a crank together with driving means therefrom to said support member to rotate the latter.

4. The combination according to claim 1 in which the supporting shaft is fixed to the tool body, together with manual operating means for rotating the rotatable elbow feeler lever support member, said rotatable support member comprising a bevel gear and said manual operating means comprising a crank connected to a bevel gear meshing with said first mentioned bevel gear.

References Cited by the Examiner

UNITED STATES PATENTS

| | | | |
|---|---|---|---|
| 1,723,529 | 8/29 | Schwieterman | 33—172 |
| 1,842,502 | 1/32 | Blomquist | 33—172 X |
| 2,483,743 | 10/49 | Turrettini | 33—172 |

FOREIGN PATENTS 1,012,080  7/57  Germany.

ISAAC LISANN, *Primary Examiner.*

ROBERT B. HULL, *Examiner.*